(12) United States Patent  
Gao

(10) Patent No.: US 7,309,970 B2
(45) Date of Patent: Dec. 18, 2007

(54) WINDSHIELD WIPER DE-ICE FUNCTION USING HVAC SWITCH POSITION

(75) Inventor: Jiyong Gao, Northville, MI (US)

(73) Assignee: DENSO International America, Inc., Southfield, MI (US)

( * ) Notice: Subject to any disclaimer, the term of this patent is extended or adjusted under 35 U.S.C. 154(b) by 16 days.

(21) Appl. No.: 11/359,911

(22) Filed: Feb. 22, 2006

(65) Prior Publication Data

US 2007/0194735 A1   Aug. 23, 2007

(51) Int. Cl.
*H02P 1/04* (2006.01)
(52) U.S. Cl. .................. 318/443; 318/282; 318/286; 318/466
(58) Field of Classification Search ............... 318/443, 318/282, 286, DIG. 2, 444, 467, 466, 484; 15/250.17, 250.16; 307/10 R
See application file for complete search history.

(56) References Cited

U.S. PATENT DOCUMENTS

| | | | | |
|---|---|---|---|---|
| 4,559,484 A | * | 12/1985 | Hirano | ................. 318/443 |
| 4,641,390 A | * | 2/1987 | Michalke | ................. 15/250.23 |
| 5,090,082 A | * | 2/1992 | Alber et al. | ............. 15/250.17 |
| 6,151,539 A | * | 11/2000 | Bergholz et al. | .............. 701/25 |

\* cited by examiner

*Primary Examiner*—Karen Masih
(74) *Attorney, Agent, or Firm*—Harness, Dickey & Pierce, PLC

(57) ABSTRACT

A vehicular windshield wiping apparatus has a temperature sensor for sensing temperatures outside of the vehicle, a humidity sensor for sensing humidity outside of the vehicle, windshield wipers moved by a motor, an HVAC control module, and a wiper control module. The wiper control module activates the windshield wipers when the moisture level is at or above a threshold value and the temperature sensor senses a temperature at or below a threshold value. The wiper motor has a first wiper park position and a second wiper park position. The first wiper park position is approximately horizontal and the second wiper park position is at an angle to the first wiper park position, in a heated windshield zone. The second wiper park position allows the wipers to remain free of ice and snow when the outside temperature and moisture levels are beyond specific thresholds or a wiper stalk switch is activated.

10 Claims, 5 Drawing Sheets

WINDSHIELD WIPER DE-ICE FUNCTION USING HVAC SWITCH POSITION

FIELD

The present disclosure relates to a vehicular windshield wiper de-icing apparatus and method, and more specifically, to a windshield wiper de-icing apparatus and method based in part upon a wiper blade second park position, a heating, ventilating and air-conditioning (HVAC) system, a windshield wiper de-ice switch and associated controllers.

BACKGROUND

The statements in this section merely provide background information related to the present disclosure and may not constitute prior art. Modern automotive vehicles typically have a pair of windshield wiper blades that retract to a substantially horizontal, stowed or park position when the wiper motor is turned off. During periods of freezing temperatures, the wiper blades are normally retracted to a position on or below the windshield such that the wiper blades do not benefit from heat emitting from an interior defroster outlet when heat is directed through the defroster outlet inside the vehicle cabin. The low wiper blade park position normally results in frozen wiper blades regardless of whether the blades are operating in an intermittent mode, as an example, or if they are turned off. When the wiper blades are operating in freezing temperatures, the frozen blades, normally made of rubber, accumulate ice and snow and do not properly seat against the windshield, thereby causing windshield streaks of water and ice. Additionally, contact noise results with the windshield due to the frozen, hardened wiper blades. Finally, when the wiper blades are turned on and operating, the wiper blades do not reside in a single position long enough to absorb heat emitting from the defroster vent, thereby resulting in frozen wiper blades.

Accordingly, a need exists for a windshield wiping apparatus and method of operation that efficiently and effectively heats wiper blades so that the blades remain pliable, do not accumulate ice and snow and seat properly against the windshield when off or in use in freezing temperatures.

SUMMARY

An apparatus and method for efficiently and effectively heating windshield wiper blades so that the blades remain pliable and seat properly against the windshield when in use in freezing temperatures is disclosed. Such an apparatus and method of operation prevents windshield streaks caused by ice and snow on the wiper blades, prevents ice and snow from accumulating on the blades, and prevents contact noise of the frozen wiper blades against the windshield. Such a windshield wiping apparatus may entail a wiper motor, wiper blades attached to wiper arms and together driven by the wiper motor to position the wiper blades in a first park position, and a wiper position switch having a first switch position and a second switch position. The second switch position corresponds to a second park position of the wiper blades, different from the first park position of the wiper blades, which corresponds to a first switch position.

Alternatively or additionally, a windshield wiping apparatus for a vehicle may utilize components for use in an automatic wiper de-icing mode. The components utilized may be a temperature sensor for sensing temperatures outside of the vehicle, a humidity sensor for sensing a moisture level outside of the vehicle, windshield wipers, an HVAC control module for directing air toward a designated windshield area, and a wiper control module for activating the windshield wipers when a humidity level is at or below a threshold value while the temperature sensor senses a temperature at or below a threshold value. A second wiper blade park position ensures that the wiper blades are heated and remain above freezing temperatures.

A method of controlling a wiper system may entail verifying that an outside temperature is less than or equal to a threshold temperature, verifying that a moisture level is greater than or equal to a threshold moisture level, actuating an HVAC mode motor so that air is directed to a specific windshield area of the vehicle, and actuating a wiper motor such that the windshield wipers are positioned in a specific, heated windshield area of the windshield. There may be two separate and distinct park positions of the windshield wipers on the windshield. A higher second park position on the windshield ensures that enough heat will penetrate the windshield and be absorbed by the wiper blades to prevent freezing of the wiper blades.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
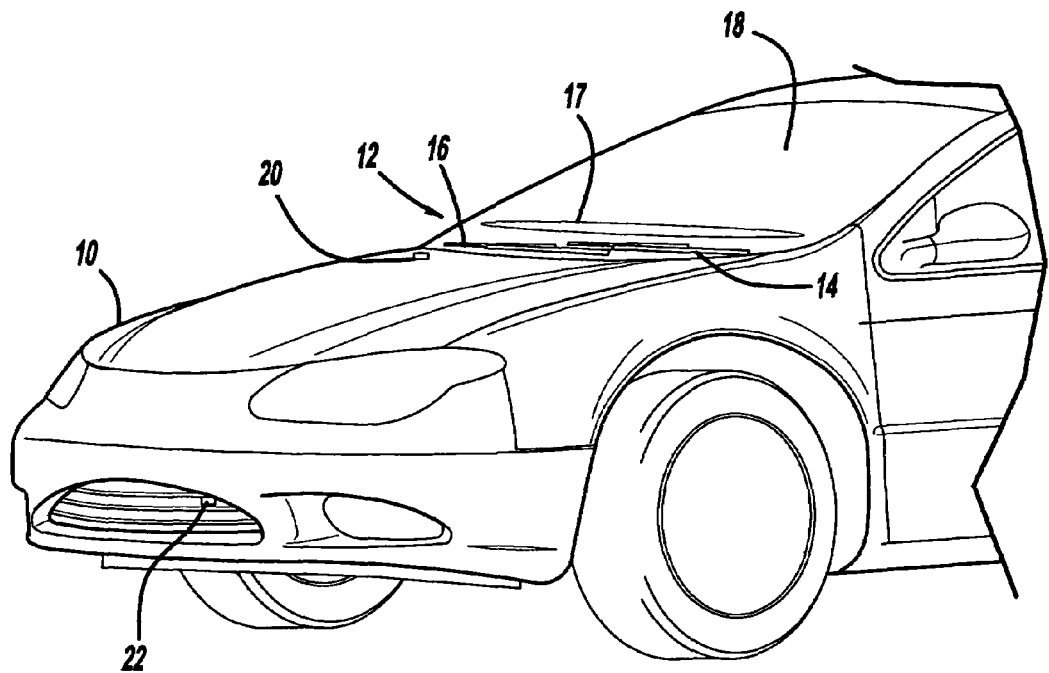
FIG. 1 is a perspective view of an automobile depicting the location of wiper blades in a low, horizontal park position.

The following description is merely exemplary in nature and is not intended to limit the present disclosure, application, or uses. It should be understood that throughout the drawings, corresponding reference numerals indicate like or corresponding parts and features.

Figure 2:
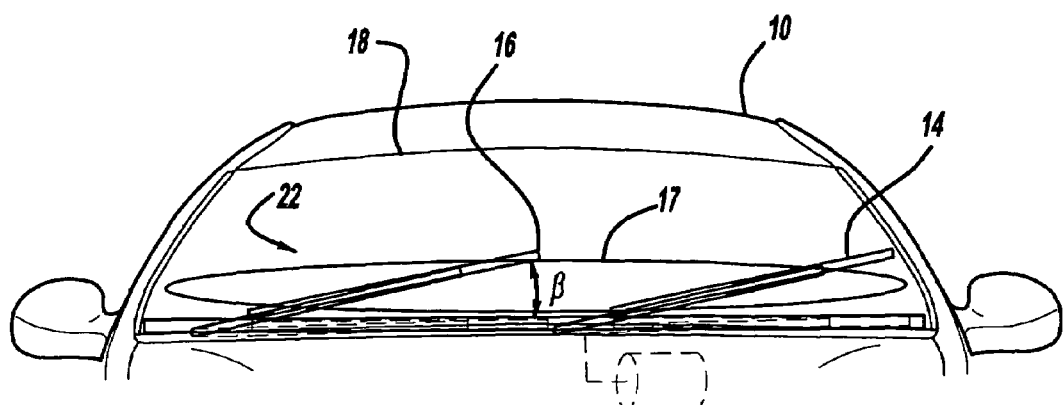
FIG. 2 is a front view of a vehicle depicting a windshield in which the wiper blades are parked at an angle P relative to the horizontal position of FIG. 1.

FIG. 1 is a perspective view of a vehicle 10, such as an automobile, depicting the location of a pair of wiper blades 14, 16 in a low park position 12. Each individual wiper, a driver wiper 14 and a passenger wiper 16, rests against a vehicle windshield 18. Additionally, an outside moisture or humidity sensor 20 and an outside ambient temperature sensor 22 are depicted. While the humidity sensor 20 is depicted at a position adjacent the windshield 18, its location is not restricted to such; likewise, while the temperature sensor 22 is depicted at the front of the vehicle 10, it may be located elsewhere about the vehicle exterior. FIG. 1 depicts the windshield wipers 14, 16 in a horizontal, first park position, below a heated windshield area 17 (FIG. 2). The heated windshield area 17 is an interior area of the windshield where an interior windshield defroster outlet 20 (FIG. 3) discharges warm air toward and against the vehicle windshield 18. More specifically, the warm air is discharged against the interior surface of the windshield 18 at area 17, which is above the low, horizontal park position 12 of the wiper blades 14, 16.

FIG. 2 is a front view of a vehicle 10. FIG. 2 depicts, the wiper blades 14, 16 parked at an angle β relative to the horizontal wiper blades 14, 16 depicted in FIG. 1. When the wiper blades 14, 16 are parked at angle β, the position or state of the blades 14, 16 will be referred to as the heated park position 22 or angled park position. The heated park position 22 is opposed to the horizontal park position 12, which is also referred to as the traditional or low park position.

Figure 3:
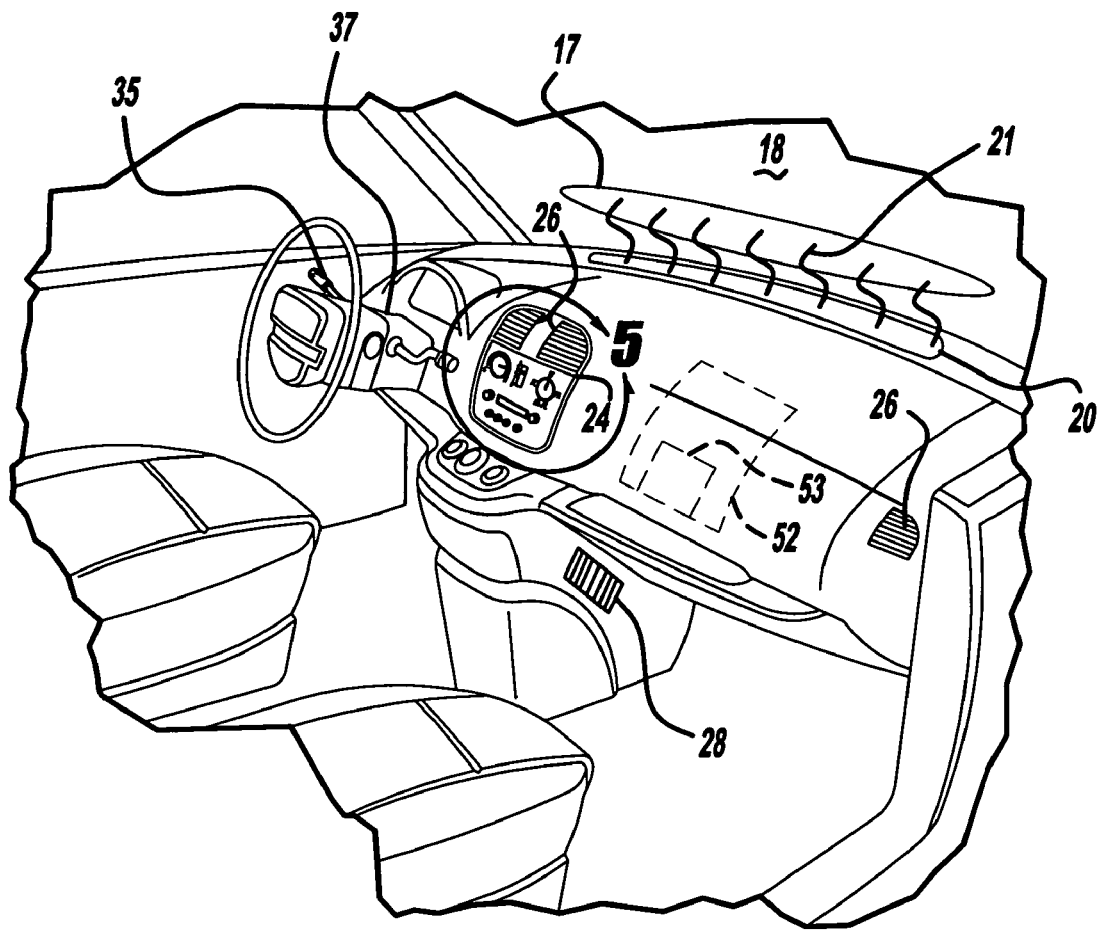
FIG. 3 is an interior perspective view of a vehicular dash depicting HVAC controls, a defroster outlet, and a wiper stalk.
Figure 5:
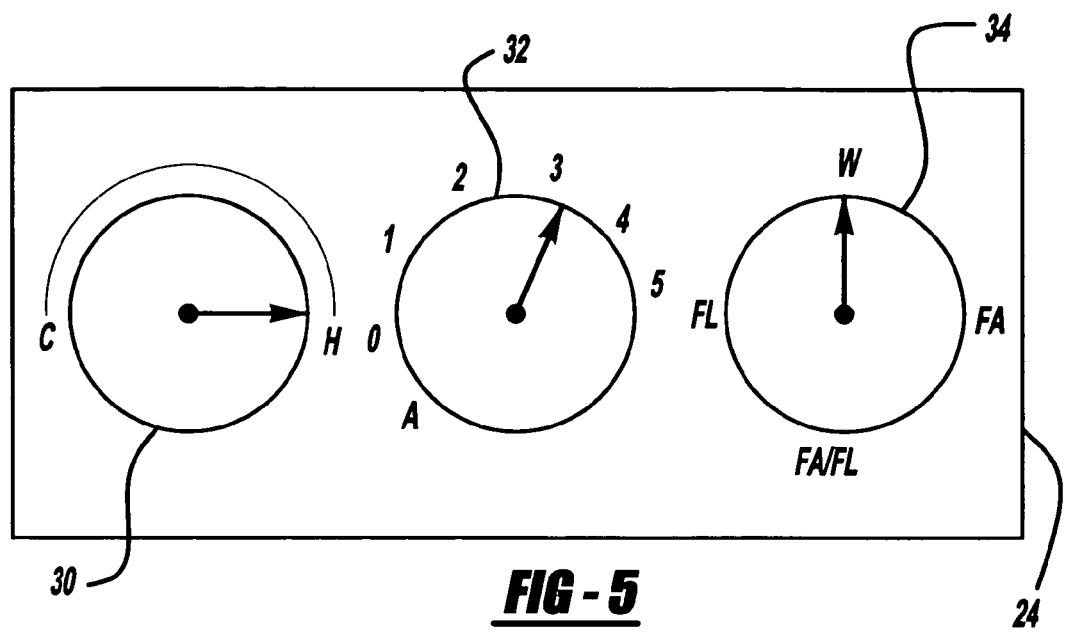
FIG. 5 is an enlarged view of the heating, ventilating and air-conditioning controls of FIG. 3.

FIG. 3 is an interior perspective view of a vehicular dash depicting a heating, ventilating and air-conditioning ("HVAC") control panel 24. An enlarged view of the control panel is depicted in FIG. 5. By adjusting the HVAC control panel 24, a user may govern whether air is discharged from the windshield defroster outlet 20, face outlet 26, foot outlet 28, or some combination thereof. More specifically, and with further reference to FIG. 5, the HVAC control panel 24 has a temperature adjustment 30, a fan speed adjustment 32, and an outlet selector 34. More specifically, the temperature adjustment 30 may be a knob that may be rotated to increase or decrease the temperature of the water circulated to a heating system heater core of the HVAC system. Additionally, the fan speed adjustment 32 may be a knob that may be rotated to select a speed of the blower (fan). The fan speed governs the rate at which the heated air is blown from each of the windshield defroster outlet 20, face outlet 26, or foot outlet 28 if such vents are selected using the outlet selector 34. The outlet selector 34 may be a knob that may be rotated to select windshield "W," floor "FL," face "FA," or face/floor "FA/FL" as air discharge options. Although specific vents and combinations of vents are depicted, still other combinations are possible.

Further elaborating on the selectable outlets/vents from which heated air may be discharged, when the fan speed selector 32 is rotated to any of positions "1" through "5," air will be blown by a fan such that the air will discharge from either the windshield defroster outlet 20, face outlet 26, or foot/floor outlet 28, depending upon where the outlet selector 34 is positioned. Elaborating, the outlet selector 34 may be positioned at any of the windshield "W," floor "FL," face "FA," or face/floor "FA/FL" positions. When the "W" position is selected, air will be discharged only from the windshield defroster outlet 20. When the outlet selector 34 is positioned at the "FA" position, air is discharged only from the face vents 26. There may be additional face vents in the dash of the vehicle, other than the three depicted in FIG. 3. When the "FL" position is selected, air will be discharged from the floor outlet 28. Finally when the "FA/FL" position is selected, air will be discharged from both, the face vents 26 and the floor outlet 28. Of course air will not be forcefully discharge from any vents unless the fan speed selector knob is positioned at one of positions "1" through "5." The fan speed selector 32 may be rotated from a fan position of "0" corresponding to an off position, to a maximum blowing volume flow rate of "5."

The temperature adjustment 30 may be rotated to adjust the temperature of air that is blown from an outlet 20, 26, 28. The temperature adjustment 30 may be rotated from a cold or "C" position to an increasingly warmer position that concludes at hot or "H." FIG. 5 also depicts a fan speed selector position of "A," which represents an "automatic" position setting, which will be described in detail, later.

Figure 4:
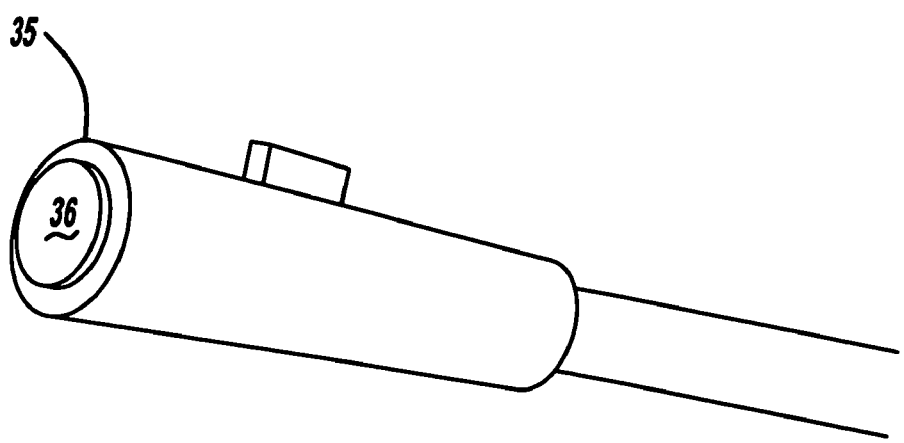
FIG. 4 is an enlarged view of a windshield wiper stalk depicting a de-ice button.

FIG. 4 is an enlarged view of a windshield wiper stalk or arm that depicts a button known as a de-ice button 36. The de-ice button 36 may be depressed to place the wiper control system into a manual wiper de-ice mode, which will be described in detail, later.

Figure 6:
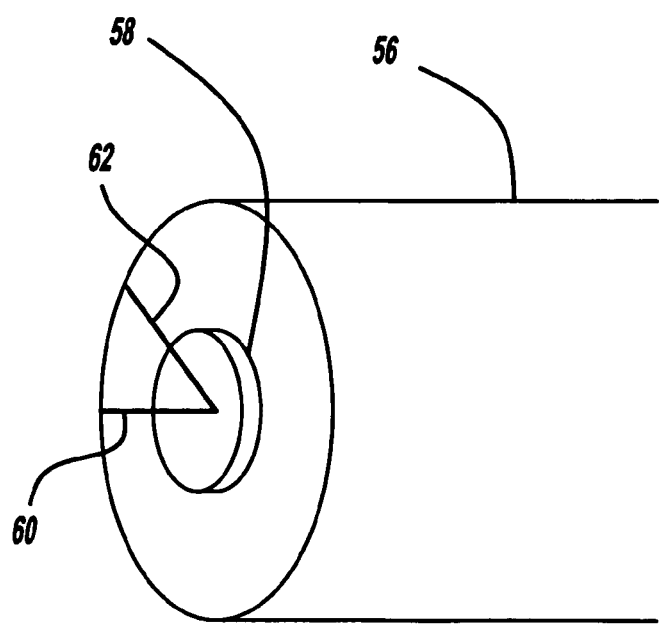
FIG. 6 is an exemplary view of a wiper motor depicting two motor shaft stop positions.

FIG. 6 depicts a wiper motor 56 having a shaft 58. Depending upon the mode of the wiper motor 56, the shaft 58 may stop in either a first stop position 60 or a second stop position 62. The stop positions 60, 62 of the wiper motor govern the stop position of the wiper blades 14, 16 on the windshield 18. When the de-ice button 36 is not depressed, the shaft 58 of the motor 56 will stop rotation of the motor at position 60, which corresponds to the horizontal position of the wipers 14, 16, as depicted in FIG. 1. When the de-ice button 36 is depressed, the shaft 58 of the motor 54 will stop rotation of the motor at position 62, which corresponds to the heated park position 22.

Figure 7:
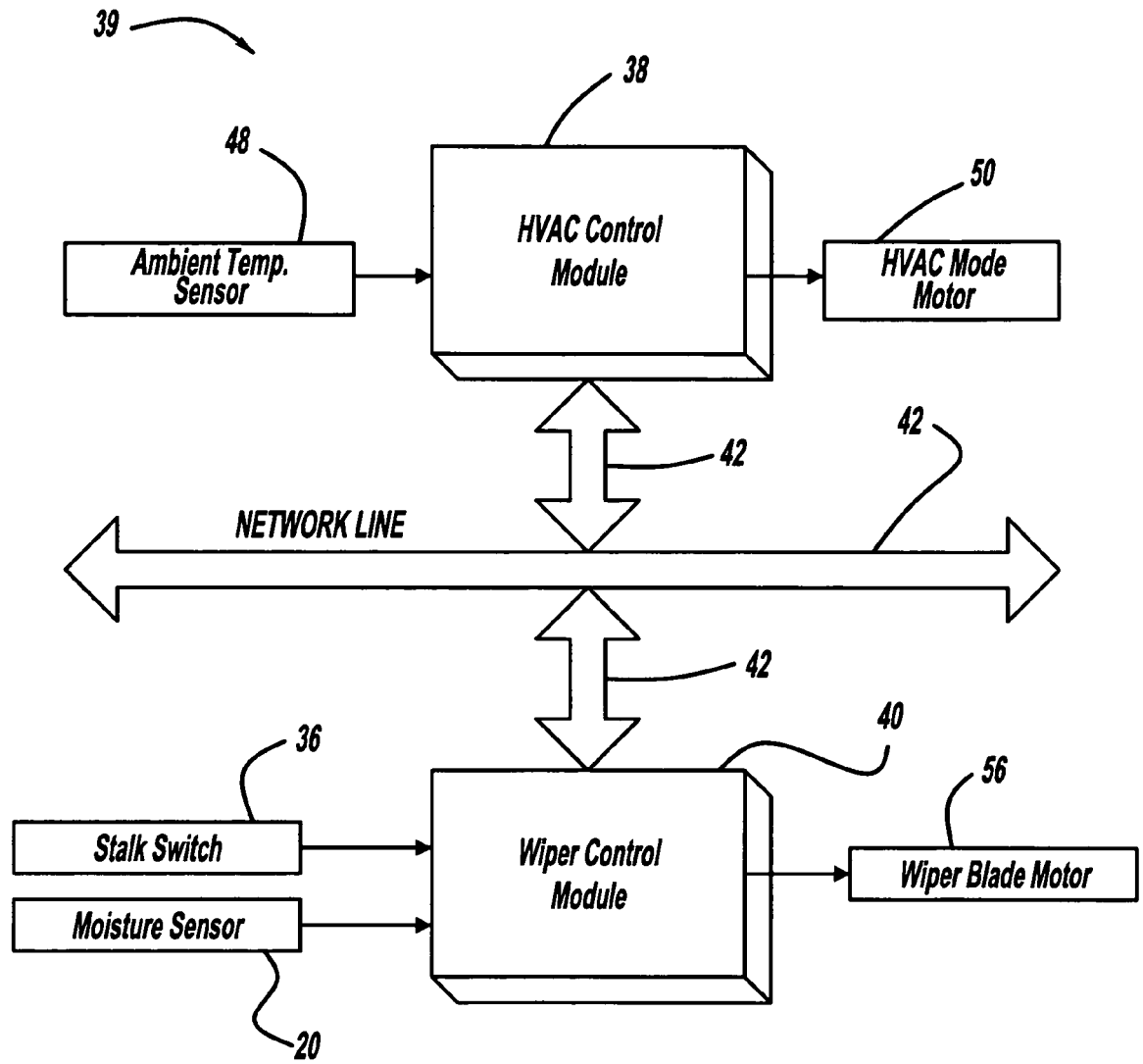
FIG. 7 is a diagram depicting the connection scheme of the various components of a wiper control system.

FIG. 7 depicts a wiper control system 39 that details a connection and communication scheme of the various wiper control system components. Generally, the wiper control system utilizes an HVAC control module 38 and a wiper control module 40. The HVAC control module 38 communicates with the wiper control module 40 through a network line 42. The HVAC control module 38 reads the ambient temperature sensor 48 such that the ambient temperature sensor inputs temperature information to the HVAC control module 38. The HVAC control module 38 outputs control signals to the HVAC mode motor 50, which controls the mode of an HVAC case 52. That is, the HVAC mode motor 50 controls the position of air passage doors that govern where air is discharged inside a vehicle cabin. Although only shown in phantom, the HVAC case 52 contains the air switching doors that move in order to govern from which outlet(s) air is discharged into the vehicle cabin. Depending upon the configuration inside the HVAC case 52, air may be directed from the defroster outlet 20, the face outlet 26, or the foot outlet 28. Alternatively, air may be directed to a combination of the face outlet 26 and foot outlet 28.

Continuing with FIG. 7, the wiper control module 40, in addition to communicating with the network line 42, receives input from the de-ice button 36, also referred to as the stalk switch, and the humidity sensor 20, also referred to as a moisture sensor. The wiper control module 40 then outputs information to the wiper blade motor 56. While the wiper blade motor 56 is linked to the wiper blades 14, 16 to control positioning and movement of the wiper blades 14, 16 on the windshield 18, details of the linkage connecting the wiper motor 56 and the wiper blades 14, 16 are not depicted in the Figures. Operations of the automatic windshield wiper de-ice system, and manual de-ice mode, will now be described.

To invoke the manual de-ice mode of the wiper blades 14, 16, the de-ice button 36 on the stalk 35 must be depressed. Upon depressing the de-ice button 36, the wiper blades 14, 16 will move from their normal, low-stowed, horizontal position, to their heated park position 22. Manually depressing the de-ice button 36 causes the movement of the wiper blades, 14, 16 by the wiper blade motor 56 after receiving input by the wiper control module 40 (FIG. 7). The user must then manually adjust the temperature adjustment 30, fan speed adjustment 32, and outlet selector 34. The temperature adjustment 30 will have to be turned toward the "H" side of the dial, as depicted in FIG. 5, such that the blown air will permit the wiper blades 14, 16 to maintain at least 32 degrees Fahrenheit. Additionally, the fan speed selector 32 must be turned to one of "1" through "4," and the outlet selector 34 must be turned to "W" so that warm air is directed to windshield area 17. When warm air is directed against the inside surface of windshield area 17, the windshield 18 will conduct heat through the windshield, which will then transfer into the parked blades 14, 16.

In the event that the wiper blades 14, 16 are being utilized to wipe the windshield surface, the blades will not pass lower than an angular position, as depicted in FIG. 2. As such, the blades 14, 16 will momentarily stop and reverse direction at windshield area 17. When the de-ice button is pressed, the wiper motor 56 will utilize the second stop position 62 of shaft 58, which represents the position necessary to cause the blades to park in the heated park position 22 at angle β, relative to a lower, horizontal park position 12 that utilizes the first stop position 60 of shaft 58.

Figure 8:
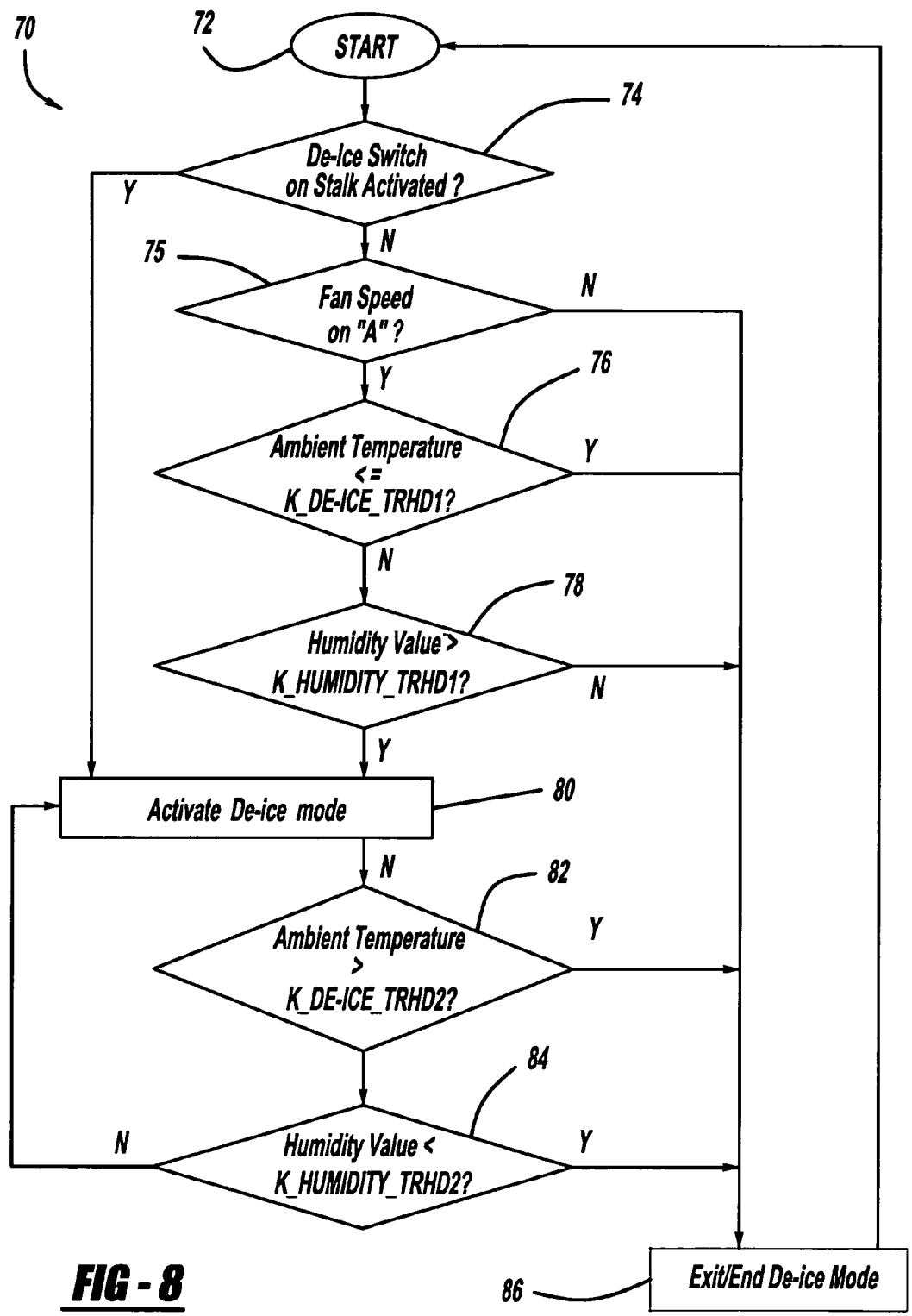
FIG. 8 is a flowchart depicting operational flow of the wiper control system when in manual or automatic mode.

Contrary to manual activation of the wiper de-ice system, utilization of the automatic windshield wiper de-ice system does not involve invocation of the de-ice button 36. The automatic wiper de-ice system will now be explained. FIG. 8 is a flowchart depicting an operational flow of a wiper control algorithm 70 that is utilized when the wiper control system 39 (FIG. 7) is placed into automatic or "auto" mode by turning the fan speed selector 32 to "A" (FIG. 5). From "start" at step 72, the logic flow moves to step 74 at which a determination is made as to whether the de-ice button 36 on the stalk 35 is activated (depressed). If the de-ice switch 36 is activated, then the logic moves to step 80, which activates the de-ice mode of the system. In such a situation, "activated" of step 74 means depressing a button 36, or moving a linear switch on the stalk 35, which may protrude from the steering column 37. If the de-ice switch is activated, then the wiper blades 14, 16 will move from their low park position 12, which is essentially horizontal and below the windshield area 17, to the designated windshield area 17 of the windshield 18 (FIG. 2). When in windshield area 17 of the windshield 18, the wiper blades 14, 16 are in the heated park position 22, also known as an angled park position. When in the heated park position 22, as depicted in FIG. 2, the wiper blades 14, 16 will benefit from heat convection currents 21 and forced, blown heat that ultimately transfer through the windshield 18 and into the wiper blades 14, 16 to maintain the wiper blades 14,16 in a non-frozen state.

Regarding the transfer of heat, a blower 53 within the HVAC case 52 blows heat-laden air from the windshield defroster outlet 20 when the temperature adjustment 30 is adjusted toward the "H" side of the scale. The heat-laden forced air is directed at and contacts the interior of windshield 18 in windshield area 17. Heat-laden air also may contact windshield area 17 by convection currents, which may run parallel to and within air currents 21. The heat warms the interior portion of the windshield 18 at area 17. The heat is then able to transfer through the windshield glass by conduction and subsequently warm the wiper blades 14, 16 by conduction because the wiper blades 14, 16 contact the windshield 18 at windshield area 17. Because the heat contacting the wiper blades 14, 16 causes the wiper blades to rise above freezing temperatures, that is, rise above the freezing point temperature of 32 degrees F., or 0 degrees C., the wiper blades 14, 16 will not freeze. Furthermore, because wiper blades 14, 16 are normally made from a material that softens with the application of heat, such as rubber, the wiper blades will wipe more effectively because they will not become frozen, and thus not become hard, and will more effectively conform to the surface of the windshield 18. The result of non-frozen wiper blades is that streaks from ice on the wiper blades 14, 16 will not occur. Pressing the button 36 is a manual activation of the wiper de-ice function. If the de-ice switch 36 is activated, then to deactivate the de-ice function, the de-ice switch 36 may be moved to the "OFF" position.

Continuing with the flow logic of FIG. 8, if the de-ice switch 36 on the stalk 35 is not activated, then the flow proceeds from step 74 to step 75, where the system determines if the fan speed selector is on automatic or "A." If the fan speed selector 32 is not turned to "A," then because of the evaluations at step 74 and step 75, neither the manual (de-ice button 36) or automatic ("A" of the fan speed selector 32) modes have been selected, respectively. As a result, the wiper blades 14, 16 stay in their horizontal position 12. The logic flow proceeds to step 86, which ends the routine; however, the logic flow then returns to step 72, start.

If the fan speed selector 32 has been turned to "A" then the logic proceeds to step 76 where the ambient temperature, sensed by the ambient temperature sensor 22 (FIG. 1) is read and compared to a value K_DE-ICE_TRHD1. K_DE-ICE_TRHD1 is a threshold temperature that corresponds to a preset temperature, such as 28 degrees Fahrenheit, which is minus 2.2 (−2.2) degrees Celsius, which will be used as an example temperature. Assuming that K_DE-ICE_TRHD1 is set at 28 degrees Fahrenheit, if the ambient temperature is greater than K_DE-ICE_TRHD1, then the logic flow moves to step 86, which exits and ends the de-ice mode and returns the logic flow to step 72, start. Alternatively, if the outside ambient temperature is less than or equal to K_DE-ICE_TRHD1, which for the present example is set at 28 degrees Fahrenheit, then the logic flow proceeds to step 78 where another evaluation is made.

Step 78 evaluates whether an outside humidity value is greater than a preset, predetermined humidity value, referred to as K_HUMIDITY_TRHD1? If the outside humidity value is not greater than K_HUMIDITY_TRHD1, then the logic flows to step 86, which causes the routine to exit and end the de-ice mode, and then directs the logic to step 72, start. K_HUMIDITY_TRHD1 is a relative humidity threshold such as 80%, as an example. Continuing with the logic flow, if the outside humidity value is greater than K_HUMIDITY_TRHD1, then the logic proceeds to step 80, and the de-ice mode is activated. Again, the de-ice mode is activated because the fan speed adjustment 32 is on "A," and the requisite outside temperature and humidity requirements have been met. The temperature sensor 22 reads the outside temperature, while the humidity sensor 20 reads the outside humidity. While the de-ice mode is activated, as described above, the logic continues to flow to step 82, at which an evaluation is made.

Step 82 evaluates whether the outside ambient temperature is greater than K_DE-ICE_TRHD2. K_DE-ICE_TRHD2 is a value that is utilized after the de-ice mode is activated. As an example, if K_DE-ICE_TRHD1 is 28 degrees Fahrenheit, then K_DE-ICE_TRHD2 must be greater than K_DE-ICE_TRHD1. K_DE-ICE_TRHD2 may be 30 degrees Fahrenheit, or higher, for explanatory purposes of this flow logic. The outside ambient temperature must be above K_DE-ICE_TRHD2 in order for the de-ice mode to exit and end at step 86 (turn off the de-ice function);

such is the result when the step 82 evaluation is "Yes." The logic flow ends and then immediately returns to step 72, start.

If the result of the step 82 determination is "No," then the logic proceeds to step 84. At step 84, an evaluation is made as to whether the outside humidity value is less than K_HUMIDITY_TRHD2. If the result of this evaluation is "No" then the logic returns to step 80 to cause the wiper system to remain in de-ice mode. If the result of this determination is "Yes," then the logic flows to step 86, which causes the logic to exit, end and then return to begin again at step 72.

K_HUMIDITY_TRHD2 is a value that is compared to the outside humidity value. As an example, if K_HUMIDITY_TRHD1 is 80%, as used above, then K_HUMIDITY_TRHD2 may be 70%. Therefore, when the outside humidity value is less than K_HUMIDITY_TRHD2 (70% as an example), the flow logic will proceed to step 86 which exits and ends the routine, and then returns it to start 72. However, if the outside humidity value is not less than K_HUMIDITY_TRHD2 (70%), then the routine returns to step 80, and the de-ice function continues with the wiper blades 14, 16 in the heated park position 22 (FIG. 2). Generally, steps 82 and 84 govern whether the ambient conditions are such to warrant continuation or exit from the automatic de-ice function. Generally, if the ambient temperature is above freezing and/or the ambient humidity is below a specific value, then the automatic de-ice function will stop. However, even if the fan speed adjustment 32 is set to "A," automatic, if ambient conditions are not within the prescribed parameters of K_DE-ICE_TRHD2 and K_HUMIDITY_TRHD2 according to the flow logic, then the de-ice mode will end and exit.

When in the heated park position 22 and when the fan speed selector is at the "A" position, the HVAC control module 38 automatically selects a fan speed. As an example, "2" or "3" may be selected, or the speed may vary with the outside ambient temperature. Likewise, the heated air temperature may automatically be adjusted by the HVAC control module 38 depending upon the temperature of the outside ambient air. The driver may control the speed at which the wiper arms move. In the event that the user desires a different fan speed, then the system can be turned off of the "A" setting and the stalk switch 36 can be manually switched to de-ice mode. This will permit the user to manually select any fan speed, and similarly, any forced air temperature.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A windshield wiping apparatus comprising:
a wiper motor;
at least one wiper blade connected to said wiper motor and positioned adjacent the windshield, said at least one wiper blade moved by the wiper motor to position said at least one wiper blade in a first approximately horizontal park position; and
a wiper position switch, said wiper position switch having a first switch position and a second switch position, said second switch position corresponding to a second park position of said at least one wiper blade, different from said first approximately horizontal park position corresponding to said first switch position, wherein said second park position is a wiper heating position and angled to said first park position.

2. The windshield wiping apparatus of claim 1, wherein said wiper position switch is located on a stalk protruding from a steering column.

3. The windshield wiping apparatus of claim 1 further comprising a defroster outlet, said defroster outlet directing air at said second park position.

4. The windshield wiping apparatus of claim 3, wherein said defroster outlet is in a top dash area.

5. The windshield wiping apparatus of claim 1, wherein said wiper motor stops said at least one wiper blade in a second shaft position when said wiper position switch is in said second switch position, said second shaft position different from a first shaft position of said first switch position.

6. A windshield wiping apparatus for a vehicle, comprising:
an HVAC control module for receiving an outside temperature from an ambient temperature sensor;
a wiper control module for receiving a humidity level outside of the vehicle via a humidity sensor;
a wiper motor activated by the wiper control module;
an HVAC mode motor to control where heated air is directed within a vehicle cabin;
at least one wiper blade moveable from a first wiper park position to a second wiper park position by the wiper motor, wherein a degree of rotation of the wiper motor is dependent upon the temperature sensed by the ambient temperature sensor and the humidity level sensed by the humidity sensor, wherein said first wiper park position is approximately horizontal and non-heated and said second wiper park position is at an angle to said first wiper park position and within a heated zone of the windshield.

7. A method of controlling a wiper system, comprising:
verifying that an outside temperature is less than or equal to a first threshold temperature;
verifying that a moisture level is greater than or equal to a first threshold moisture level;
actuating an HVAC mode motor such that air is directed to a specific interior windshield area; and
actuating a wiper motor and positioning a windshield wiper.

8. The method of claim 7, further comprising verifying that an outside temperature is greater than a second threshold temperature.

9. The method of claim 7, further comprising verifying that a humidity level is less than a second threshold moisture level.

10. The method of claim 7, wherein positioning the windshield wiper further comprises angling a park position of the windshield wiper.

* * * * *